US006678319B1

United States Patent
Jamali (10) Patent No.: US 6,678,319 B1
(45) Date of Patent: Jan. 13, 2004

(54) DIGITAL SIGNAL PROCESSING FOR HIGH-SPEED COMMUNICATIONS

(75) Inventor: Hamadi Jamali, Redwood City, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/481,805

(22) Filed: Jan. 11, 2000

(51) Int. Cl.[7] .............................. H03H 7/40; H04B 1/10
(52) U.S. Cl. ....................................... 375/234; 375/350
(58) Field of Search ................................ 375/340, 346, 375/285, 231, 234, 350, 232, 316; 708/300, 322, 321; 333/18, 28 R (56) References Cited

U.S. PATENT DOCUMENTS 5,301,167 A * 4/1994 Proakis et al. .............. 367/134
5,481,564 A * 1/1996 Kakuishi et al. ............ 375/230

* cited by examiner

Primary Examiner—Tesfaldet Bocure

(74) Attorney, Agent, or Firm—Fitzpatrick, Cella, Harper & Scinto (57) ABSTRACT

Communication channel characteristics are determined without the use of a training mode using a single-valued solution. A received signal $x_t$ is sent to an equalizer (508) which compensates for noise added to the received signal $x_t$ during transmission. To accurately determine the weights of the equalizer (508), the output of the equalizer (508) is transmitted to an amplitude square extractor (512) to generate a value representative of the amplitude of the received signal $x_t$. Then, a forward-mapping module (516) maps the amplitude value from the n-dimensional space of the amplitude value to an augmented space having, in a preferred embodiment $n^2$ dimensions. In the augmented space, an augmented space blind adaptation mechanism (520) is applied to generate a single-valued channel characteristic value in terms of an augmented space variable. Then, a backward-mapping module (524) is applied to generale the optimal weights for the equalizer (508) allowing an accurate recovery of the original signal $s_t$. The principles of the present invention can be applied to generate all of the filters required in high-speed data communications, and can be used for any other system in which channel characteristics are desired.

19 Claims, 10 Drawing Sheets

DIGITAL SIGNAL PROCESSING FOR HIGH-SPEED COMMUNICATIONS

BACKGROUND OF THE INVENTION i. Technical Field

This invention pertains to the field of high-speed communications, and more specifically, to signal recovery systems and methods.

ii. Background Art

Figure 1:
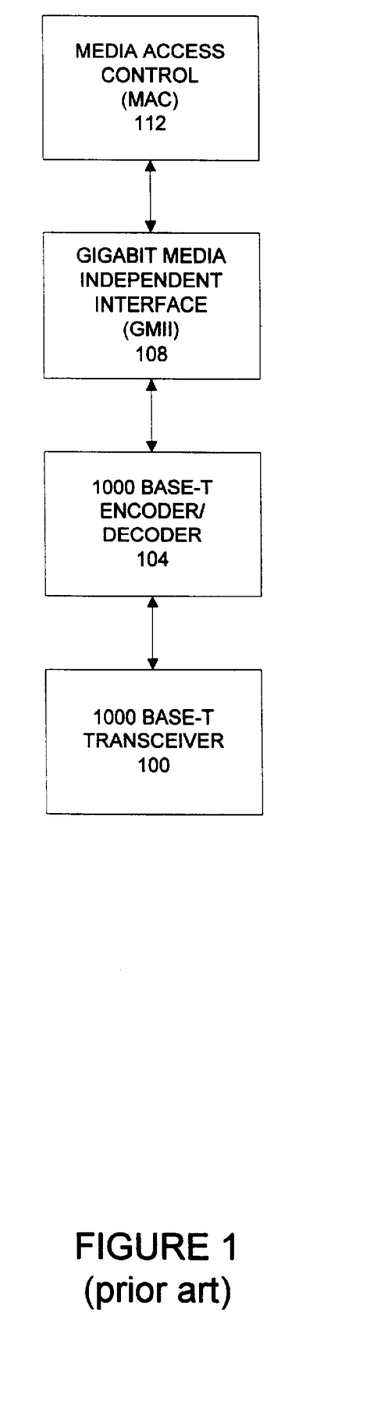
FIG. 1 illustrates a simplified block diagram of the functional elements of Gigabit Ethernet over copper as specified in the IEEE standard.

High-speed communication is a primary focus in the computer and information fields. High-speed communication is desirable in internal networks, external networks, chip-to-chip communications, and any other application in which large amounts of data must be transferred quickly. In a typical local area network, Ethernet connections provide data rates of between 10 Mbps and 100 Mbps. However, this bandwidth is quickly becoming insufficient for modern applications. Data rates in the gigabit range are more optimal for modern applications. Despite the limitations of Ethernet technology, it still provides advantages over competing solutions, including simplicity, low cost, network reliability, availability of management tools, and a high marketplace acceptance. Therefore, a solution to providing higher bandwidth should be preferably compatible with Ethernet technology to be most effective. An IEEE standard has been promulgated for using Ethernet technology for gigabit applications. FIG. 1 illustrates a simplified block diagram of the functional elements of gigabit Ethernet over copper protocol, as defined in the IEEE standard IEEE Std 802.3ab, approved Jun. 28, 1999. The Media Access Control (MAC) layer 112 arbitrates transmission among all nodes attached to the network. It supports both half and full duplex (transmission/reception) operations. The Gigabit Media Independent Interface (GMII) 108 is a digital interface for carrying unencoded data over separate transmit and receive paths. It connects the MAC 112 to various Gigabit Ethernet physical layer components (such as copper). The 1000 Base-T Encoder/Decoder 104 codes and decodes the signals to be sent and received over the physical layer. Finally, the 1000 Base-T Transceiver 100 contains the physical transmitter and receiver used to transmit and receive the high data rate transmissions. The transceiver 100 is coupled to the physical transmission medium.

Figure 2:
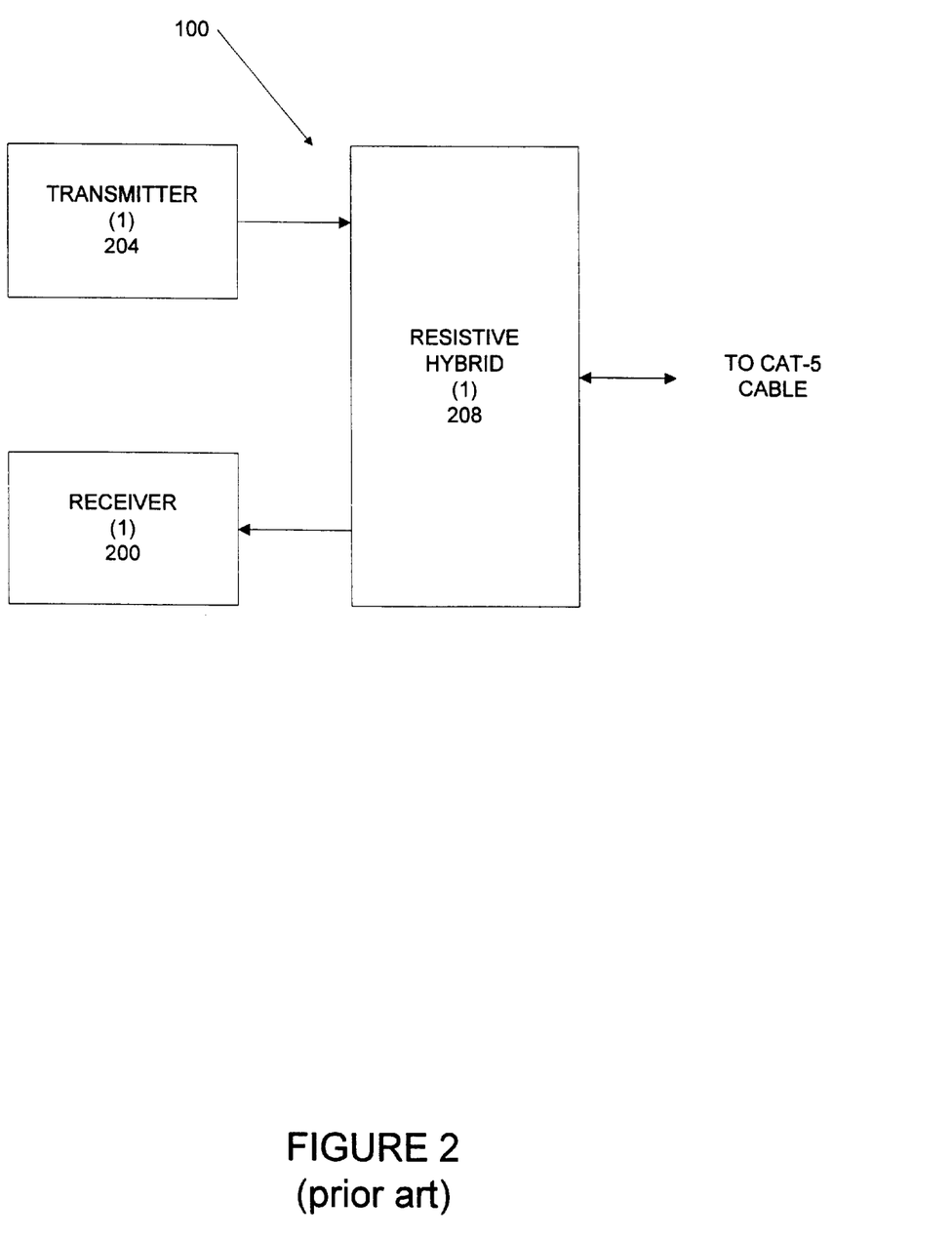
FIG. 2 illustrates a simplified block diagram of the functional elements of a 1000 Base-T transceiver as specified in the IEEE standard.

FIG. 2 illustrates a block diagram of the IEEE-specified transceiver 100. A receiver 200 and a transmitter 204 are coupled to a resistive hybrid 208. The resistive hybrid 208 enables bidirectional transmission over single wire pairs by filtering out the transmit signal from interfering with other signals received by the receiver 200. The receipt of the transmit signal at the receiver 100 is called near-echo. As there are four pairs of wires for a category-5 cable, four sets of the components illustrated in FIG. 2 are used.

The most widely deployed cabling system for local area networks is unshielded twisted pair legacy Category 5 copper wiring. Therefore, a receiver enabling high bandwidth transmission preferably accounts for this existing physical infrastructure and its inherent signal impairments. Transmitting a 1000 Mb/s or higher data stream over four pairs of Category 5 unshielded twisted pair cables introduces several channel impairments that were not present or as significant when 10 Mb/s or 100 Mb/s data streams were being transmitted over the Ethernet. These impairments include signal attenuation, i.e., the signal loss due to cabling from transmitter to receiver; echo, which occurs when transmit and receive signals occupy the same wire pair and interfere with each other; noise and intersymbol interference, defined as any unwanted disturbance in the communication channel; and crosstalk, which arises from close coupling of adjacent wire pairs. All of these impairments lead to degradation of the signal quality. Digital signal processing techniques are typically used to address these impairments, including through the use of adaptive filters in a receiver to eliminate intersymbol interference due to attenuation, adaptive filters for echo canceling, and adaptive filters for crosstalk elimination.

Figure 3:
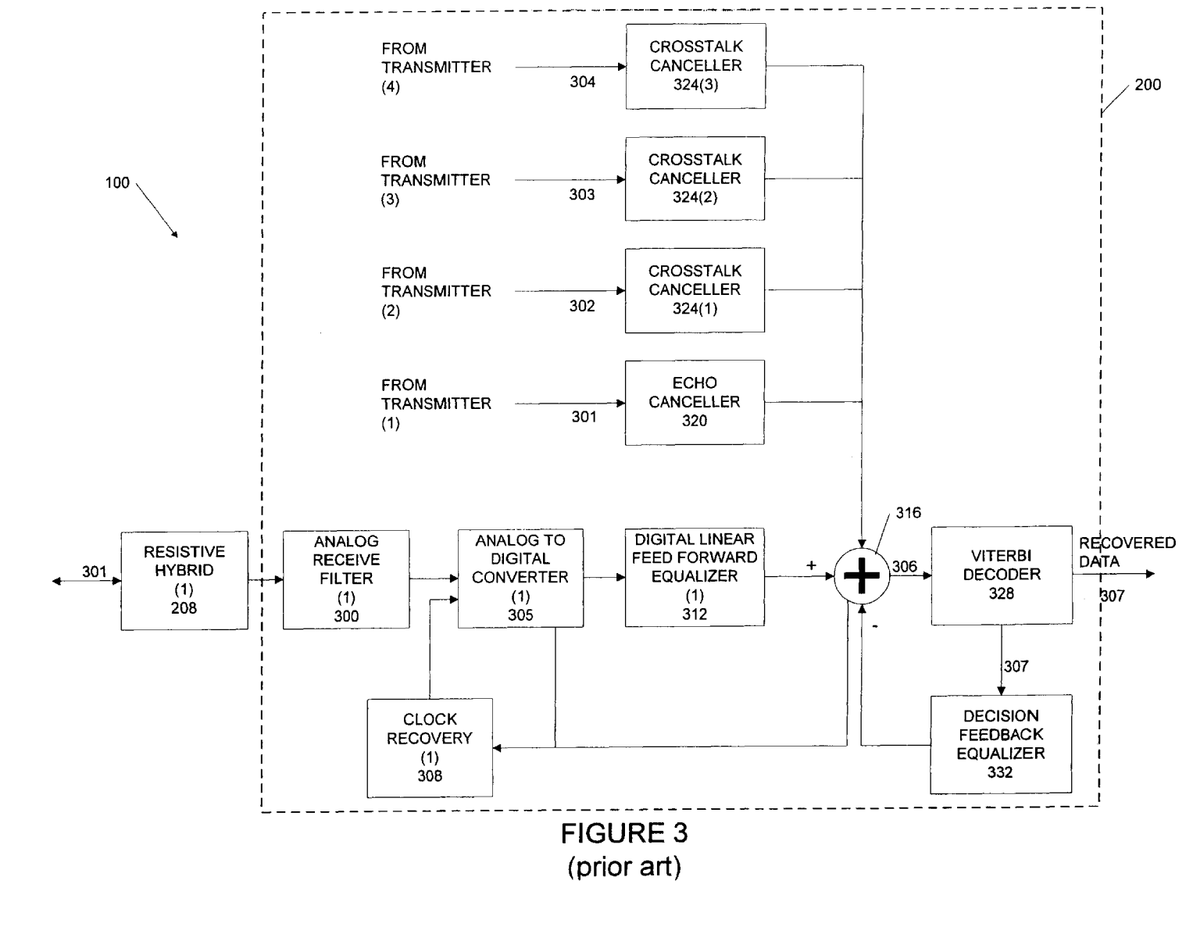
FIG. 3 illustrates a simplified block diagram of the functional elements of the receiver circuitry in the 1000 Base-T transceiver as specified by the IEEE standard.

FIG. 3 illustrates the IEEE standard implementation of the receiver 200. A received signal 301 is received over one of the twisted pairs into the resistive hybrid 208. Next, the analog receive filter 300 receives the analog signal and filters out general noise. Then, the received analog signal is converted into a digital signal through a analog-to-digital converter 305, through the input of a clock recovery unit 308 that derives a clock signal from the received signal as input from the analog-to-digital converter 305 and adder 316. The clock recovery unit 308 receives the signal to generate the clock. The clock recovery unit 308 synchronizes the receiver to the carrier frequency. Then, the digital linear feedforward equalizer 312 eliminates any intersymbol interference. The output of the digital linear feedforward equalizer 312 is fed to an adder 316, which also receives the outputs from four other filters. The other filters provide crosstalk and echo compensation. An echo canceller 320 receives the signal 301 and provides a value that indicates the error introduced from the reflection of the signal transmitted from the transmitter 204 reflected back off the destination. Crosstalk canceller 324(1) receives a signal 302 transmitted across one of the other twisted pair. The crosstalk canceller 324(1) produces a value indicating the error introduced from the coupling of the twisted pair carrying signal 302 to the twisted pair carrying signal 301. The other crosstalk cancellers 324(2), 324(3) produce values indicating the error introduced from the coupling of the other twisted pairs. The number of taps per channel required for each of these filters have been shown to be between 8 and 16 for the Feed Forward Equalizer, 19 and 14 for the Decision Feedback Equalizer, 70 and 80 for the Crosstalk Cancellers, and 60 and 120 for the Echo Canceller. The adder 316 then provides a composite signal 306 that represents the received signal 301 filtered for the above noise factors. The output 306 of the adder 316 is fed to a Viterbi decoder 328 that uses coding to help recover transmitted symbol in the presence of high noise. The output of the Viterbi decoder 328 is the recovered data 307. The output 307 is also fed to a decision feedback equalizer 332 that adjusts the adder 316 to compensate for any error detected in transmission.

The IEEE standard does not specify the implementation of the digital filters 312, 320, 324, and 332. Existing filters require extensive training to learn the correct filter parameters that will overcome the channel impairments. In these filters, a sample of the input signal is used in a training mode at the receiver 200 to determine the characteristics of the channel, and to compensate for those characteristics. These filters then use a variety of digital signal processing techniques to generate the channel characteristics. However, to ensure that the channel characterization remains accurate, the training of the filter must be repeated each time a link is lost, the channel dynamics change, or the noise characteristics vary. Thus, networks that rely on training waste valuable bandwidth, as the time required for training is used at the expense of actual transmission time.

In an attempt to eliminate the requirement of training, other systems use receivers having blind adaptive filters.

Figure 4:
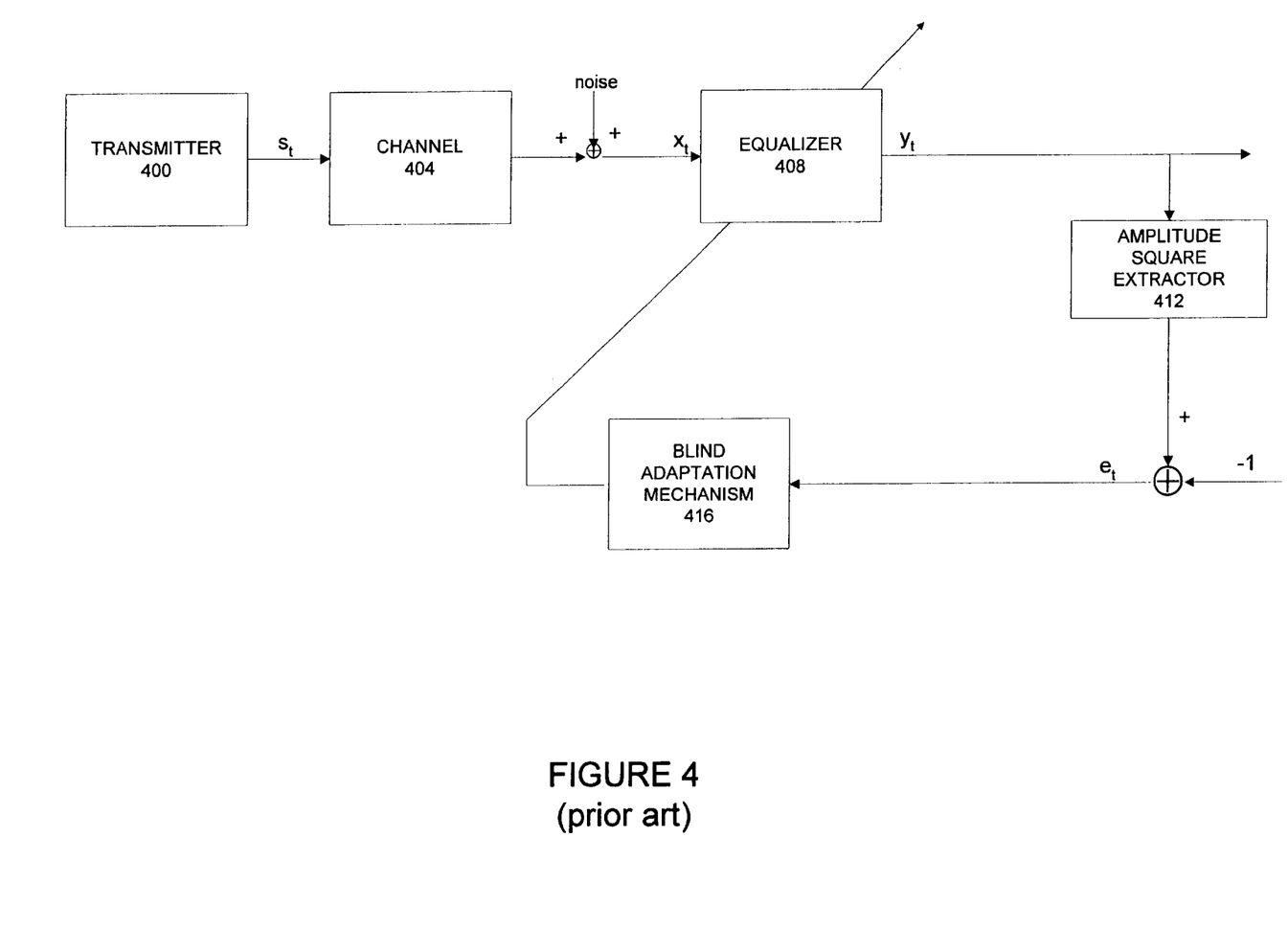
FIG. 4 illustrates a simplified block diagram of a prior art communication system using a blind adaptive filter as equalizer.

Blind adaptive filters use only the amplitude of the input signal to recreate channel characteristics. FIG. 4 illustrates a block diagram of a blind adaptive filter. A transmitter 400 at a remote site transmits a signal $s_t$ through a channel 404 to an equalizer 408. Channel 404 adds noise and intersymbol interference to the signal $s_t$ resulting in a corrupted signal $x_t$. The equalizer 408 is designed to recover the input signal $s_t$ from the signal corrupted by intersymbol interference and noise $x_t$. To determine the parameters of the equalizer 408, an amplitude square extractor 412 is used to provide the square of the amplitude of the received signal $x_t$ to the blind adaptive mechanism 416. The blind adaptive mechanism 416 uses the squared amplitude to generate characteristics of the channel 404. The channel characteristics are generated to emulate the noise and the intersymbol interference added to the signal $s_t$ during transmission. Once the channel characteristics are known, the equalizer 408 can be adjusted to compensate for the channel characteristics.

Many practical and popular digital communication systems use blind adaptive filters. In these systems, the amplitude of the signal throughout the transmission link is supposed to remain constant, and therefore its use does not require special a priori knowledge or measurements of the input signal. However, determining the characteristics of the channel 404 from using only the amplitude of the input signal is extremely difficult. Blind adaptive systems generate multiple possible solutions, and provide no basis for choosing between the multiple solutions. In blind adaptive systems, the channel parameters must be reproduced from the amplitude squared equation: $e_t = |y_t|^2 - 1$. However, since only the amplitude is known, this equation is difficult to solve for channel parameters because there is no known closed form expression of it in terms of W, where W is a vector representing the weights of the equalizer. In conventional systems, an approximation was used to determine the value of W. The approximation used determines Was $W_t = W_{t-1} - \mu y_{t-1} X_{t-1} e_{t-1}$, where the vector $X_t$ is the vector of the n received sequence samples. The innovation term $\mu y_{t-1} X_{t-1} e_{t-1}$, was designed to generate solutions for W from the constant amplitude equation. However, the approximation parameter generates multiple solutions for possible weights to be used for the equalizer, and did not provide a basis for distinguishing between them. Therefore, these systems are less accurate and less reliable than those which use a training mode. However, as discussed above, systems using training modes waste bandwidth and are more costly than the blind adaptive filter systems.

Thus, a system is needed which overcomes channel impairments and provides for high-speed data communication without requiring the use of training, and provides single value accurate solutions.

DISCLOSURE OF INVENTION

Figure 5:
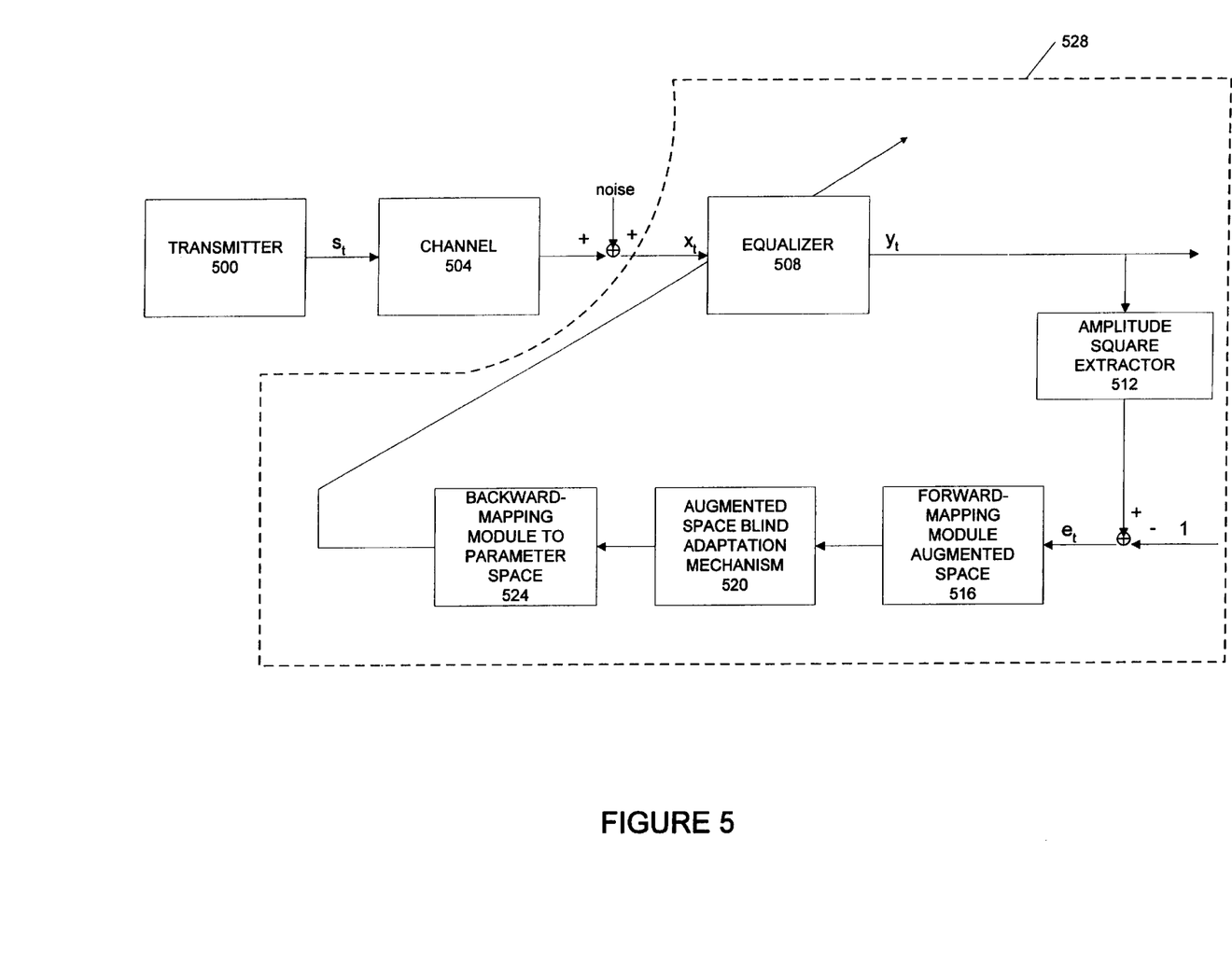
FIG. 5 is a block diagram of a communication system in accordance with the present invention.

In accordance with the present invention, a system, method, and apparatus of characterizing channel characteristics and recovering an original signal without the use of a training mode that provides single-valued solutions is disclosed. In accordance with the present invention, a received signal is sent to an equalizer (508) which compensates for intersymbol interference and noise added to the transmitted signal $s_t$ during transmission. To accurately determine the weights of the equalizer (508), the output of the equalizer (508) is transmitted to an amplitude square extractor (512) to generate a value that approximates the amplitude of the originally transmitted signal $s_t$. Then, a forward-mapping module (516) maps the amplitude value from the n-dimensional space $s_t$ of the amplitude value to an augmented space having, in a preferred embodiment, $n^2$ dimensions. In the augmented space, an augmented space blind adaptation mechanism (520) is applied to generate a single-valued channel characteristic value in terms of an augmented space variable. Then, a backward-mapping module (524) is applied to generate the optimal weights for the equalizer (508) allowing an accurate recovery of the original signal. The principles of the present invention can be applied to generate all of the filters required in high-speed data communications, and can be used for any other system in which channel characteristics are desired.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 7:
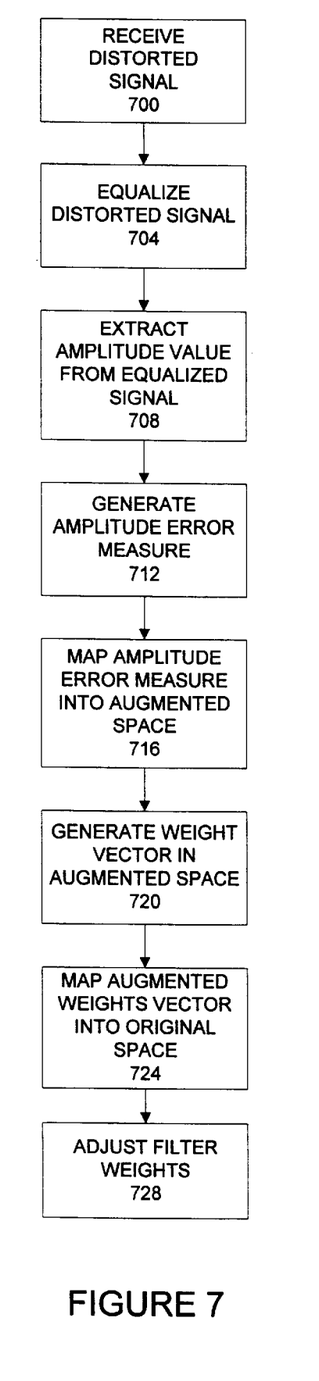
FIG. 7 is a flowchart illustrating a preferred method of compensating for a signal that has been distorted by transmission through a channel.

FIG. 5 illustrates a block diagram of a preferred communication system in accordance with the present invention. FIG. 7 is a flowchart illustrating a preferred method of compensating for a signal that has been distorted by transmission through a channel. The description below references both Figures together. A transmitter 500 transmits a signal $s_t$ through a channel 504. Noise is added to the channel 504 from the sources discussed above, and, along with intersymbol interference, produces the signal $x_t$, which is received by the receiver 528. More specifically, an equalizer 508 receives 700 the distorted signal $x_t$ and generates 704 an output signal $y_t$ that approximates the transmitted signal $s_t$. The output signal $y_t$ is then decoded into bits and processed accordingly. In ideal conditions, $y_t$ is equal to $s_t$, and the equalizer 508 is the inverse of the transfer function of the channel 504. However, the equalizer 508 is typically not the exact inverse of the transfer function of the channel 504, and thus $y_t$ does not equal $s_t$, and the information contained in $s_t$ is not properly recovered by the receiver 528.

Figure 6:
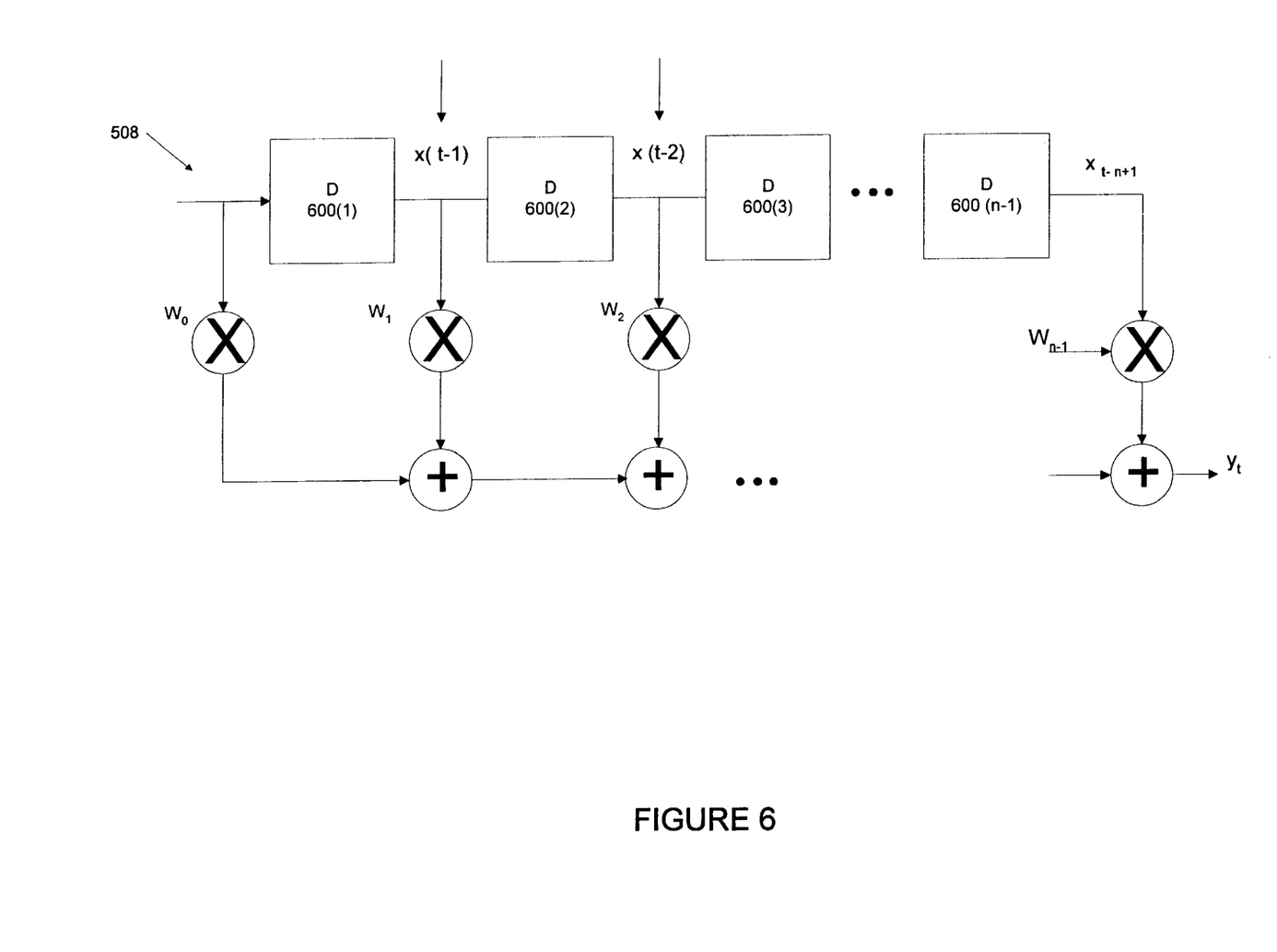
FIG. 6 illustrates a preferred implementation of the equalizer 508.

To remedy this problem, the weights of the equalizer 508 which determine the characteristics of the equalizer 508 are adjusted to provide a more exact recovery. FIG. 6 illustrates a preferred implementation of the equalizer 508. The corrupted signal $x_t$ is transmitted to a first delay element 600(1), and is split off to a multiplier which multiplies $x_t$ into a first weight value $w_0$. The delayed $x_t$ (denominated as $x_{t-1}$) is transmitted to a second delay element 600(2), and is also split off and multiplied by a second weight $w_1$. The two values, $x_t w_0$ and $x_{t-1} w_1$ are added together. This is repeated for n−1 delay elements 600, and the resulting value is equal to $y_t$. Thus, by adjusting the weights, the value of $y_t$ can be adjusted until it closely approximates the original signal $s_t$.

Referring back to FIGS. 5 and 7, the output signal $y_t$ is sent to an amplitude square extractor 512, that extracts 708 an amplitude value from the output signal $y_t$. An error measure is generated 712 as the output of the amplitude square extractor 512 minus one (1). The resulting value $e_t$ is sent to a forward-mapping module 516. As the idealized amplitude of a transmitted signal is 1, the difference between the amplitude of the received signal and 1 represents the error introduced by the channel 504 that has not been equalized by the equalizer 508.

Then, in accordance with the present invention, a forward-mapping module 516 maps 716 $e_t$ to a new augmented space. The new augmented space preferably has $n^2$ dimensions, where n is the number of dimensions in the original $e_t$ space. Once mapped, an augmented space blind adaptation mechanism 520 is applied to generate 720 a weight vector value in the augmented space responsive to a set of initial conditions, designated $\theta_0$, in terms of the augmented space weight vector variable θ. The initial condition $\theta_0$ is arbitrary and can be set to equal zero. This solution in the augmented space will generate a single valued solution, in contrast to the solutions generated by conventional blind adaptive systems. Once the single value weight vector solution is found in terms of θ, the augmented space weight vector solution is mapped 724 back into the original space of $e_t$ by a backward-mapping module 524. In an embodiment in which an equalizer 508 is being adjusted responsive to channel characteristics, the resulting weight values are used to adjust 728 the weights of the equalizer 508. In an embodiment where only channel characteristics are desired, the resulting weight values characterize the channel 504. Thus, in accordance with the present invention, a new method is disclosed that does not require the use of a training sequence to generate channel characteristics, and still provides an accurate single valued solutions. As is known to those of ordinary skill in the art, once a single valued augmented weight vector is known, this data can be used in many different applications, including simply channel characterization, or channel equalization, implementation in any type of recovery filter such as an echo-canceller, cross-talk canceller, or any other filter used to recover a transmitted signal corrupted by noise and intersymbol interference.

The details of the mapping modules 516, 524, and the adaptation mechanism 520 are now described. However, one of ordinary skill in the art will understand that the description describes one method of performing the present invention; other variations of this method will be apparent from the descriptions given herein.

The overall function describing the system of FIG. 5 is $$y_t = W'X_t \qquad (1)$$

where $y_t$ is a real scalar variable designating the output of the filter at time t, $W=[w_0 w_1 w_2 \ldots w_{n-1}]'$ is the n×1 vector of the n real coefficients of the filter, $X_t=[x_t x_{t-1} x_{t-2} \ldots x_{t-n+1}]'$ is the n×1 vector of the last n real samples of the received sequence at time t, and ' is the transpose operator. The filter length n can be a fixed number from any of the ranges above, or determined automatically. A preferred method of calculating the order n of the filter is performed by first considering the direct form implementation of the filter and then calculating the rank of the matrix $R_{\phi\phi}$. This gives the desired order of the filter. Throughout, when W and $X_t$ are complex valued, the operator ' is replaced by *, which is the complex conjugate and transpose operator. This equation characterizes the equalized signal sequence $y_t$ as being equal to the received signal sequence augmented by noise, the vector $X_t$, multiplied by a series of weights, as described by the vector W'. Once the proper weights are known, the input signal $s_t$ can be accurately recovered from the noise-augmented signal $x_t$. However, as described above, conventional solutions to this problem have required either a training sequence to recover the weights, or have generated solutions that are not reliable in their characterization of the channel 504. Thus, the forward-mapping module 516 receives the error signal $e_t$, and maps the values into an augmented space. As discussed above, the augmented space has $n^2$ dimensions, where n is the number of dimensions of the original space.

More specifically, the amplitude square extractor provides the error value $e_t$ to the forward mapping module 516: $e_t=|y_t|^2-1$. Once $e_t$ is known, the parameters for the channel characteristics are such that the function $J=1/p\Sigma e_t p$ is minimum, where p is an arbitrary integer, typically, p=4. Then, the forwarding mapping module 516 maps J into augmented space using a conversion equation:

$$J = \frac{1}{p}\theta^1 R_{\phi\phi}\theta - \frac{2}{p}\theta^1 P_\phi + \frac{1}{p} \qquad (2)$$

Then, in augmented space, θ is solved for, and once θ is known, W is solved for using θ. This solution to W provides a single valued solution representing the optimal weight of the equalizer 508, without requiring training.

The variable θ in the conversion equation is a nonlinear tensor of the weight vector W, which represents the filter coefficients to be solved for. In the preferred embodiment, θ is the mathematical Kronecker product of W. That is, $$\theta=[w_0 W' w_1 W' w_2 W' \ldots w_{n-1} W']' \qquad (3)$$

The quantity $R_{\phi\phi}$ in the conversion equation is a matrix of appropriate dimensions containing statistical elements of the received sequence $X_t$. In one preferred embodiment, $R_{\phi\phi}$ is a square matrix made up of the elements of the fourth order moment of the received sequence $X_t$. That is, $$R_{\phi\phi}=E[\phi_t \phi_t] \qquad (4)$$

where E is the mathematical expectation operator and $\phi_t$, is a nonlinear tensor of the data vector $X_t$. In the preferred embodiment, $\phi_t$, is the mathematical Kronecker product of the data vector $X_t$. That is, $$\phi_t=[x_t X'_t x_{t-1} X'_t x_{t-2} X'_t \ldots x_{t-n+1} X'_t]' \qquad (5)$$

The variable $P_\phi$ in the conversion equation is a vector of appropriate dimensions containing statistical elements of the received sequence $X_t$. In the preferred embodiment, $P_\phi$ is a vector made up of the elements of the second order moment of the received sequence $X_t$. That is, $$P_\phi=E[\phi_t] \qquad (6)$$

where the different symbols are as defined earlier. Thus, once $R_{\phi\phi}$ and $P_\phi$ are known, any optimization method can be used to calculate the vector θ from equation (2). Preferably, the desired θ is the value that minimizes J. Then, θ can be solved for a single value of W using equation (3), and thus provide for the reproduction of the original signal without requiring a priori knowledge of the signal's frequency characteristics, the channel characteristics, or the use of a training mode.

There are several ways to calculate the quantities $R_{\phi\phi}$ and $P_\phi$ expressions (4) and (6) in equation (2) if they are not known in advance. For example, averaging over some finite number of samples can be used. Also, time averaging can be used instead. In addition, windowing and overlap can also be used.

In one embodiment, $R_{\phi\phi}$ and $P_\phi$ are known ahead of time and are fed to the system in the same manner as $\theta_0$. Then, the augmented space blind adaptation mechanism is used to calculate the channel characteristics responsive to $\theta_0$ and the calculated R and P.

There are several methods of solving for W once θ is known. For example, W can be obtained by using the first n components only from θ. This can be done by the following algorithm for $$w_i = \frac{t_i}{\sqrt{|t_0|}}, \ t_0 \neq 0$$

where $w_i$ is the $i^{th}$ component of the vector W and $t_i$ is the $i^{th}$ component of the vector θ.

Also, W can be computed from the square terms only, or the cross terms only, or some combination of the two, from θ. This can be done using the following algorithm:

for i=0 to n-1, $w_i = \sqrt{\tau_j|\phi(\tau_j)}$
where j=i(n+1); in the case of complex data.

$$j = in - \sum_{K=0}^{i-1} k;$$

in the case of real valued data.
and $\phi(t_j)$ is the phase of the $j^{th}$ component of the vector θ.

Figure 8:
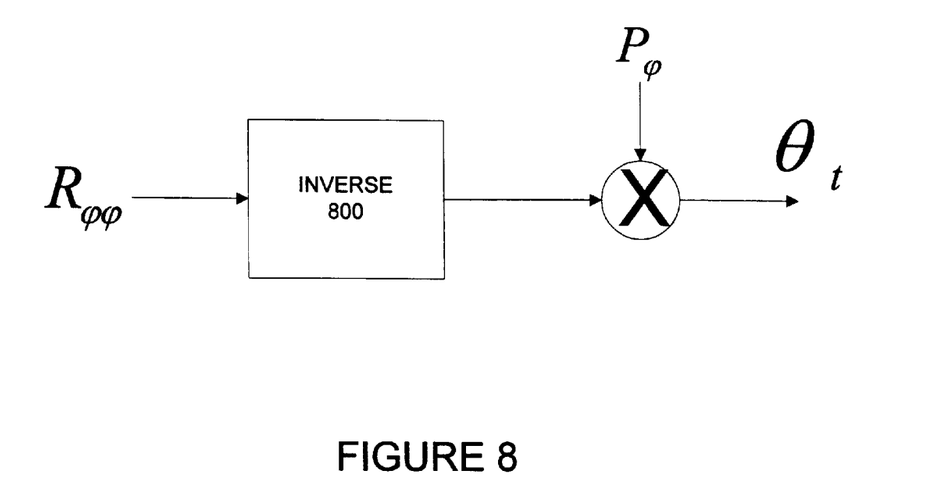
FIGS. 8–14 are block diagrams illustrating different circuit structures for calculating the variable $\theta_t$.

There are also several ways to calculate θ in accordance with the present invention. One method as implemented in the circuit illustrated in FIG. 8, calculates θ from $$\theta = R_{\phi\phi}^{-1} P_\phi \quad (7)$$

where $R_{\phi\phi}^{-1}$ is the inverse of the matrix $R_{\phi\phi}$ and the other symbols are as defined earlier. In this embodiment, there is no need for initial case $\theta_0$.

Given the desired θ from equation (7), equation (3) is used to solve for the filter's coefficients vector W. There are several ways to calculate $R_{\phi\phi}^{-1}$ in equation (7) known to those of ordinary skill in the art, for example, through LU decomposition, eigenvalues decomposition, SVD decomposition, QR decomposition, or other decompositions. There are also several ways to solve the system of equations:

$$R_{\phi\phi}\theta = P_\phi \quad (8)$$

For example, this system of equations can be solved through LU factorization, Gaussian elimination, or any of above mentioned decompositions, as would be known to those of ordinary skill in the art. Once the desired θ is obtained, equation (3) is used to solve for the filter's coefficients vector W.

Figure 9:
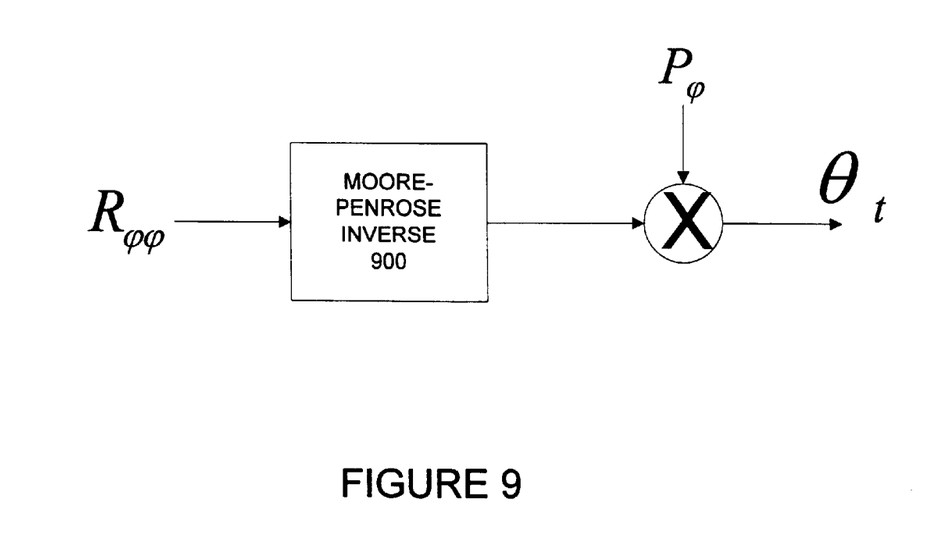

A second method of calculating θ, as shown in FIG. 9, in accordance with the present invention is given by:

$$\theta = R^+_{\phi\phi} P_\phi \quad (9)$$

where $R^+_{\phi\phi}$ is the Moore-Penrose Inverse of the matrix $R_{\phi\phi}$. This type of inverse is useful when the matrix $R_{\phi\phi}$ is not a square matrix, or is singular, or ill conditioned. The other symbols are as defined earlier. Here, again, there is no need for the initial conditions $\theta_0$. There are several ways to calculate $R^+_{\phi\phi}$ in equation (9). For example, through LU decomposition, eigenvalues decomposition, SVD decomposition, QR decomposition, or other decompositions. Once the desired θ is obtained, equation (3) is used to solve for the filter's coefficients vector W. Again, other methods known to those of ordinary skill in the art can also be used to solve for W.

Figure 10:
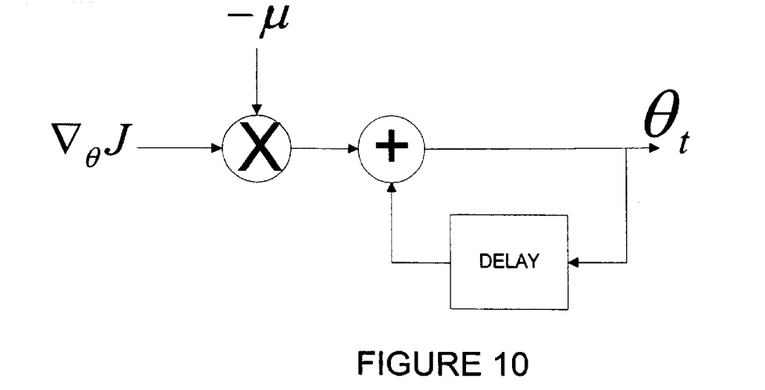

A third method of calculating θ as shown in FIG. 10, is given by $$\theta_t = \theta_{t-1} - \mu \nabla_\theta J \quad (10)$$

where $\theta_t$ is the augmented vector θ at time t, $\nabla_\theta J$ is the gradient with respect to the vector θ of the functional J in equation (2), and $\mu$ is a small constant that controls the adaptation process obeying:

$$0 < \mu < \frac{2}{\lambda_{max}(R_{\varphi\varphi})} \quad (11)$$

with $\lambda_{max}(R_{\phi\phi})$ being the maximum eigenvalue of the matrix $R_{\phi\phi}$. At the start of the algorithm in equation 10 (that is, at time t=1), one needs to know $\theta_0$ to determine $\theta_1$. However, $\theta_0$ is usually known as the initial condition, and can be set to zero. There are several ways to implement equation (10) in accordance with the present invention. For example, (10) can be implemented as a direct form, as a lattice form, as a parallel structure, or as a systolic structure.

The constant $\mu$ can also be determined from $$0 < \mu < \frac{2}{\left(\sum_{i=1}^{n} \lambda_i R_{\varphi\varphi}\right)}$$

or from $$0 < \mu < \frac{2}{\sum_{i=1}^{n} r(i,i)}$$

with r(i,i) being the elements of the main diagonal of the matrix $R_{\phi\phi}$.

Once the desired θ is obtained, as discussed above, equation (3) or an equivalent is used to solve for the filter's coefficients vector W. The vector W can also be calculated iteratively for each iteration of the vector θ.

Figure 11:
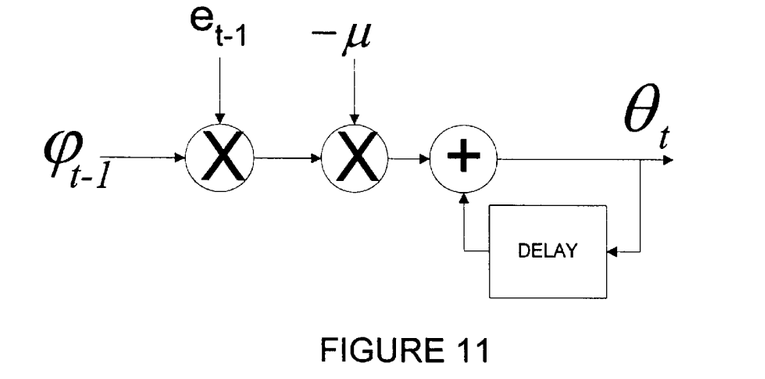

A fourth method of calculating θ as shown in FIG. 11, is given by:

$$\theta_t = \theta_{t-1} - \mu e_{t-1} \phi_{t-1} \quad (12)$$

where $e_t = |y_t|^2 - 1$ is the deviation of the filter output level from some known level of the input that is set by the coding scheme. Generally, the filter can be scaled such that l=1. The other variables are as defined earlier. As with equation (1), for the start of the algorithm in equation 12, one needs to know $\theta_0$ to determine $\theta_1$. Again, $\theta_0$ can be set to zero. There are several ways to implement equation (12) in accordance with the present invention. For example, (12) can be implemented as a direct form, as a lattice form, as a parallel structure, or as a systolic structure. Once the desired θ is obtained, equation (3) is used to solve for the filter's coefficients vector W.

Figure 12:
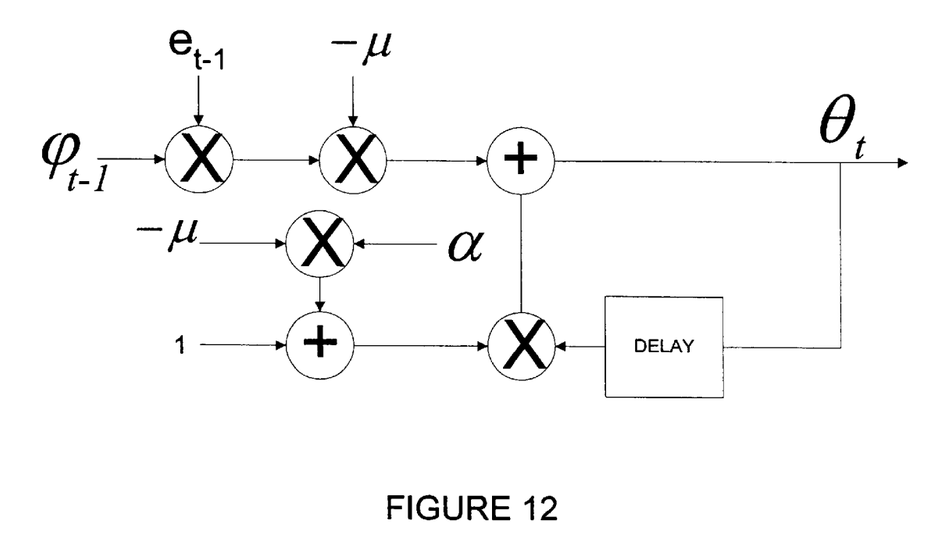

A fifth method of calculating θ, as shown in FIG. 12, is given by:

$$\theta_t = (1-\mu\alpha)\theta_{t-1} + \mu e_{t-1}\phi_{t-1} \quad (13)$$

where $$0 < a < \frac{1}{1-\mu}$$

and the other variables are as defined earlier, and $\theta_0$ is set to equal θ. There are several ways to implement equation (13) in accordance with the present invention. For example, (13) can be implemented as a direct form, as a lattice form, as a parallel structure, or as a systolic structure. Once the desired θ is obtained, as discussed above, equation (3) is used to solve for the filter's coefficients vector W.

Figure 13:
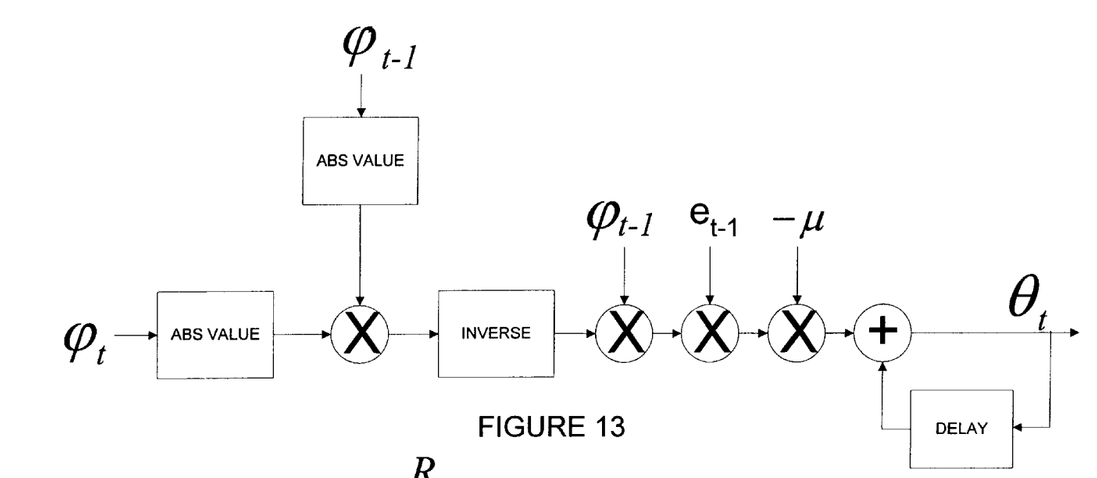

A sixth method of calculating θ in accordance with the present invention, as shown in FIG. 13, is given by:

$$\theta_t = \theta_{t-1} - \mu e_{t-1} \frac{\varphi_{t-1}}{|\varphi_{t-1}|^2} \quad (14)$$

where $|\phi_t|^2$ is the norm of the augmented data vector and the other variables are as defined earlier and $\theta_0$ is set to equal 0. There are several ways to implement equation (14). For example, (14) can be implemented as a direct form, as a lattice form, as a parallel structure, or as a systolic structure. Once the desired θ is obtained, use equation (3) to solve for the filter's coefficients vector W.

A seventh method of calculating θ in accordance with the present invention, implemented in a similar manner as the circuit illustrated in FIG. 10, is given by:

$$\theta_t = \theta_{t-1} - \mu e_{t-1}\phi_{t-1} \quad (15)$$

where μ, is now time variable and needs to be calculated at each step. The other symbols are as defined earlier and $\theta_0$ is set to equal 0. There are several ways to implement equation (15). For example, (15) can be implemented as a direct form, as a lattice form, as a parallel structure, or as a systolic structure. Once the desired θ is obtained, equation (3) can be used to solve for the filter's coefficients vector W.

Figure 14:
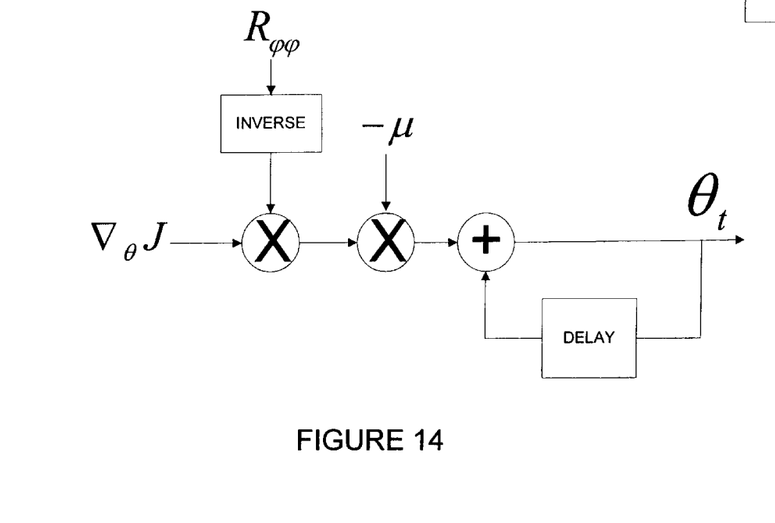

An eighth method of calculating θ in accordance with the present invention as shown in FIG. 14 is given by:

$$\theta_t = \theta_{t-1} - \mu Inv(R_{\phi\phi})\nabla_\theta J \text{ where } 0<\mu<2. \quad (16)$$

There are several ways to implement equation (16). For example, (15) can be implemented as a direct form, as a lattice form, as a parallel structure, or as a systolic structure. Once the desired θ is obtained, equation (3) can be used to solve for the filter's coefficients vector W.

Although several exemplary embodiments of calculating θ are described herein, other variations of the structures of FIGS. 11–13 to generate θ would be apparent to one of ordinary skill in the art and are considered to be within the scope of the present invention. Additionally, one of ordinary skill in the art would be able to implement the above algorithms in variations of the above described filter structures, and such implementation details are also considered to be within the scope of the present invention.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for recovering signal content from a transmitted signal to which distortion has been added by a transmission path, said method comprising the steps of:
   receiving the transmitted signal with added distortion;
   filtering the transmitted signal according to adjustable filter weights so as to generate an output signal that approximates the transmitted signal, wherein a finite impulse response filter is used to filter the transmitted signal;
   extracting an amplitude value from the output signal, wherein said amplitude value is an approximation of an amplitude value of the received signal prior to transmission of the received signal;
   converting the extracted amplitude value to a set of values representing the added distortion; and
   adjusting the filter weights of said filtering step responsive to the set of values representing the added distortion,
   wherein the converting step comprises the substeps of:
      solving the equation $y_t = W'X_t$ for W, where $y_t$ is a real scalar variable designating an output at time t, $W=[w_0 w_1 w_2 \ldots w_{n-1}]'$ is the n×1 vector of the n real coefficients of the finite impulse response filter, $X_t=[x_t x_{t-1} x_{t-2} \ldots x_{t-n+1}]'$ is the n×1 vector of the last n real samples of the received transmitted signal at time t, and ' is the transpose operator.

2. The method of claim 1, wherein
   W is calculated from θ; and
   θ is calculated from the equation $$J = \frac{1}{p}\theta' R_{\phi\phi}\theta - \frac{2}{p}P_\phi + \frac{1}{p},$$

where p is
an arbitrary integer, θ is a nonlinear tensor of vector W, $W=[w_0 w_1 w_2 \ldots w_{n-1}]'$ is the n×1 vector of the n real coefficients of a filter representing the transmission path, $R_{\phi\phi}$ is a matrix containing statistical elements of the received transmitted signal, and $P_\phi$ is a vector made up of the elements of the second order moment of the received transmitted signal.

3. The method of claim 2, wherein W is calculated from θ as
   $\theta=[w_0 W'w_1 W'w_2 W' \ldots w_{n-1}W']'$.

4. The method of claim 2, wherein θ is solved for a single value of W.

5. The method of claim 2 wherein $R_{\phi\phi}$ is a square matrix made up of the elements of the fourth order moment of the received transmitted signal.

6. The method of claim 5 further comprising the step of:
   calculating $R_{\phi\phi}=E[\phi_t\phi_t']$ where E is the mathematical expectation operator and $\phi_t$ is a nonlinear tensor of the data vector X, where $X_t=[x_t x_{t-1} x_{t-2} \ldots x_{t-n+1}]'$ is the n×1 vector of the last n real samples of the received transmitted signal at time t.

7. The method of claim 6, wherein $\phi_t$ is the mathematical Kronecker product of the weight vector W.

8. The method of claim 6, wherein calculating θ further comprises:
   calculating θ from $\theta=R^+_{\phi\phi}P_\phi$, where $R^+_{\phi\phi}$ is the Moore-Penrose Inverse of the matrix $R_{\phi\phi}$.

9. The method of claim 6, wherein calculating θ further comprises:
calculating θ from $\theta_t = \theta_{t-1} - \mu e_{t-1}\phi_{t-1}$ where $e_{t-1}$ is the amplitude estimate value given by $e_t = |y_t|^2 - 1$, and $\mu$ is a small constant that controls the adaptation process by obeying:

$$0 < \mu < \frac{2}{\lambda_{\max}(R_{\varphi\varphi})}$$

with $\lambda_{max}(R_{\phi\phi})$ being the maximum eigenvalue of the matrix $R_{\phi\phi}$.

10. The method of claim 6, wherein calculating θ further comprises:
calculating θ from $\theta_t = (1 - \mu\alpha)\theta_{t-1} + \mu e_{t-1}\phi_{t-1}$ where $$0 < a < \frac{1}{1-\mu},$$

$e_{t-1}$ is the amplitude estimate value given by $e_t = |y_t|^2 - 1$, and $\mu$ is a small constant that controls the adaptation process obeying:

$$0 < \mu < \frac{2}{\lambda_{\max}(R_{\varphi\varphi})}$$

with $\lambda_{max}(R_{\phi\phi})$ being the maximum eigenvalue of the matrix $R_{\phi\phi}$.

11. The method of claim 6, wherein calculating θ further comprises:
calculating θ from $$\theta_t = \theta_{t-1} - \mu e_{t-1}\frac{\varphi_{t-1}}{|\varphi_{t-1}|^2}$$

where $|\phi_{t-1}|^2$ is a norm of the augmented data vector $\phi_t$, $e_{t-1}$ is the amplitude estimate value given by $e_t = |y_t|^2 - 1$, and $\mu$ is a small constant that controls the adaptation process obeying:

$$0 < \mu < \frac{2}{\lambda_{\max}(R_{\varphi\varphi})}$$

with $\lambda_{max}(R_{\phi\phi})$ being the maximum eigenvalue of the matrix $R_{\phi\phi}$.

12. The method of claim 5 further comprising the step of:
calculating $R_{\phi\phi} = E[\phi_t\phi_t']$, where the summation is from $t=0$ to $L$, where $L$ is selected by a designer of a filter performing the calculating step, and where $\phi_t$ is a nonlinear tensor of the data vector $X$, where $X_t = [x_t x_{t-1} x_{t-2} \ldots x_{t-n+1}]'$ is the $n \times 1$ vector of the last n real samples of the received transmitted signal at time t.

13. The method of claim 2, wherein calculating θ further comprises:
calculating θ from $\theta = R^{-1}_{\phi\phi}P_\phi$, where $R^{-1}_{\phi\phi}$ is the inverse of the matrix $R_{\phi\phi}$.

14. The method of claim 2, wherein calculating θ further comprises:
calculating θ from $\theta_t = \theta_{t-1} - \mu\nabla_\theta J$ where $\theta_t$ is augmented vector θ at time t, $\nabla_\theta J$ is the gradient with respect to the vector θ of the functional J in equation (2), and $\mu$ is a small constant that controls the adaptation process obeying:

$$0 < \mu < \frac{2}{\lambda_{\max}(R_{\varphi\varphi})}$$

with $\lambda_{max}(R_{\phi\phi})$ being the maximum eigenvalue of the matrix $R_{\phi\phi}$.

15. An apparatus for recovering signal content from a transmitted signal to which distortion has been added by a transmission path, said apparatus comprising:
an equalizer, having an input coupled to the transmitted signal to which distortion has been added, and having adjustable weights for modifying the distorted signal to compensate for the added distortion to generate a compensated output signal;
an amplitude square extractor coupled to the output of the equalizer, for generating an amplitude value of the compensated output signal;
a forward-mapping module, coupled to the amplitude square extractor, for mapping the amplitude value into an augmented space;
a blind adaptation mechanism, coupled to the forward-mapping module, for generating channel characteristics in terms of an augmented space variable; and
a backward-mapping module, coupled to the blind adaptation mechanism and to the equalizer, for generating weight values from the channel characteristics and transmitting the weight values to the equalizer to adjust the weights of the equalizer to produce a compensated signal that more closely approximates the transmitted signal prior to distortion being added.

16. An apparatus for characterizing a transmission path, said apparatus comprising:
a receiver, for receiving a signal that has been transmitted along the transmission path to be characterized;
an amplitude square extractor coupled to the output of the receiver, for generating an amplitude value of the received signal;
a forward-mapping module, coupled to the amplitude square extractor, for mapping the amplitude value into an augmented space; and
a blind adaptation mechanism, coupled to the forward-mapping module, for generating channel characteristics in terms of an augmented space variable.

17. The apparatus of claim 16 in which the amplitude square extractor generates a value in an original space, and the forward-mapping module maps the amplitude value from the original space into the augmented space, the apparatus further comprising:
a backward-mapping module, coupled to the blind adaptation mechanism, for mapping the channel characteristics into the original space.

18. A method for recovering signal content from a transmitted signal to which distortion has been added by a transmission path, said method comprising:
generating a compensated output signal from the transmitted signal, said generating step including the step of equalizing the transmitted signal to which distortion;
generating an amplitude value from the compensated output signal;
forward-mapping the amplitude value into an augmented space;
generating channel characteristics of the transmission path in terms of a space variable in the augmented space by applying a blind adaptation mechanism to the amplitude value; and generating weight values from the channel characteristics by applying a backward-maping module, wherein the generated weight values are used in said equalization step to adjust the weights to produce a compensated signal that more closely approximates the transmitted signal prior to distortion being added.

19. A method for characterizing a transmission path, said method comprising:

receiving a signal that has been transmitted along the transmission path to be characterized;

generating an amplitude value of the received signal;

mapping the amplitude value into an augmented space by using a forward-mapping module; and generating channel characteristics of the transmission path in terms of a space variable in the augmented space by applying a blind adaptation mechanism to the mapped amplitude value.

* * * * *

UNITED STATES PATENT AND TRADEMARK OFFICE
CERTIFICATE OF CORRECTION

PATENT NO. : 6,678,319 B1
DATED : January 13, 2004
INVENTOR(S) : Hamadi Jamali

It is certified that error appears in the above-identified patent and that said Letters Patent is hereby corrected as shown below:

Column 2,
Line 15, "a" should read -- an --.

Column 3,
Line 36, "Was" should read -- W as --.

Column 6,
Line 49, "$R_{\phi\phi}=E[\phi_t\phi]$" should read -- $R_{\phi\phi}=E[\phi_t\phi_t']$ --; and
Lines 51 and 53, "$\phi_t$," should read -- $\phi_t$ --.

Column 7,
Line 26, "Wand" should read -- W and --.

Column 9,
Line 49, "$\theta_t=\theta_{t-1}-\mu Inv(R_{\phi\phi})\nabla_\theta J$ where $0<\mu<2$" should read -- $\theta_t=\theta_{t-1}-\mu Inv(R_{\phi\phi})\nabla_\theta J$ where $0<\mu<2$ --; and
Line 52, "(15)" should read -- (16) --.

Column 10,
Line 36, "$J = \frac{1}{p}\theta' R_{\phi\phi}\theta - \frac{2}{p}P_\phi + \frac{1}{p},$" should read -- $J = \frac{1}{p}\theta' R_{\phi\phi}\theta - \frac{2}{p}\theta P_\phi + \frac{1}{p},$ --.

Column 12,
Line 58, "distortion;" should read -- distortion has been added; --.

UNITED STATES PATENT AND TRADEMARK OFFICE
CERTIFICATE OF CORRECTION

PATENT NO. : 6,678,319 B1
DATED : January 13, 2004
INVENTOR(S) : Hamadi Jamali It is certified that error appears in the above-identified patent and that said Letters Patent is hereby corrected as shown below:

Column 13,
Line 2, "backward-maping" should read -- backward-mapping --.

Signed and Sealed this

Twenty-eighth Day of September, 2004

JON W. DUDAS
*Director of the United States Patent and Trademark Office*